(12) United States Patent
Allidieres et al.

(10) Patent No.: US 11,519,554 B2
(45) Date of Patent: Dec. 6, 2022

(54) METHOD AND DEVICE FOR FILLING A STORAGE VESSEL WITH LIQUEFIED GAS

(71) Applicant: L'Air Liquide, Societe Anonyme pour l'Etude et l'Exploitation des Procedes Georges Claude, Paris (FR)

(72) Inventors: Laurent Allidieres, Paris (FR); Anh Thao Thieu, Les Loges-en-Josas (FR); Thomas Fayer, Sassenage (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 16/778,149

(22) Filed: Jan. 31, 2020

(65) Prior Publication Data
US 2020/0248870 A1    Aug. 6, 2020

(30) Foreign Application Priority Data

Jan. 31, 2019 (FR) ........................................ 1900911

(51) Int. Cl.
*F17C 5/00* (2006.01)
*F17C 5/02* (2006.01)
*B63B 79/10* (2020.01)

(52) U.S. Cl.
CPC .............. *F17C 5/007* (2013.01); *B63B 79/10* (2020.01); *F17C 5/02* (2013.01)

(58) Field of Classification Search
CPC .... F17C 5/007; F17C 5/02; F17C 2205/0332; F17C 2201/032; F17C 2203/0391; F17C 2201/054; F17C 2201/035; F17C 2205/0364; F17C 2205/0326; F17C 2205/0329; F17C 2221/012; F17C 2223/0161; F17C 2223/035;
(Continued)

(56) References Cited

U.S. PATENT DOCUMENTS 5,231,838 A  *  8/1993  Cieslukowski ........... F17C 7/02
                                                              123/525
5,421,162 A  *  6/1995  Gustafson ................. F17C 9/02
                                                              123/525
(Continued)

FOREIGN PATENT DOCUMENTS

CN       105 822 894      8/2016
FR         3 041 624      3/2017

OTHER PUBLICATIONS

French Search Report and Written Opinion (Machine Translated) for FR 1900911, dated Sep. 27, 2019.

*Primary Examiner* — Mary E McManmon
*Assistant Examiner* — Stephanie A Shrieves
(74) *Attorney, Agent, or Firm* — Christopher J. Cronin

(57) ABSTRACT

Method for filling a storage vessel with liquefied gas by means of a tank of liquefied gas, the method comprising a step of transferring liquefied gas from the tank into the storage vessel by means of a pressure differential, wherein the storage vessel prior to the transfer step has an internal pressure higher than the internal pressure of the tank, the method comprising, prior to the transfer step, a step of placing the tank and the storage vessel in fluidic communication in order to ensure a drop in the pressure in the storage vessel to the benefit of the tank and a step of increasing the pressure in the tank using a pressurizing device.

3 Claims, 1 Drawing Sheet

(58) Field of Classification Search
CPC ........ F17C 2225/0161; F17C 2223/033; F17C 2225/033; F17C 2225/035; F17C 2227/0107; F17C 2227/04; F17C 2250/032; F17C 2250/043; F17C 2260/025; F17C 2265/063; F17C 2270/0171; F17C 13/04; F17C 13/02; F17C 2227/041; F17C 2227/048; F17C 2250/0626; B63B 79/10; Y02E 60/32; B67C 3/06; B67C 3/08
USPC .......................................................... 141/4
See application file for complete search history.

(56) References Cited

U.S. PATENT DOCUMENTS

| | | | | |
|---|---|---|---|---|
| 5,941,081 A * | 8/1999 | Burgener | ................ | F17C 7/02 62/50.1 |
| 6,044,647 A * | 4/2000 | Drube | ................ | F17C 7/02 141/2 |
| 6,622,758 B2 * | 9/2003 | Drube | ................ | F17C 5/02 141/192 |
| 7,131,278 B2 * | 11/2006 | Svensson | ................ | F17C 6/00 62/50.1 |
| 7,617,848 B2 * | 11/2009 | Matheoud | ................ | F17C 5/02 141/82 |
| 9,206,776 B2 * | 12/2015 | Bui | ................ | B63H 21/12 |
| 2006/0130925 A1 * | 6/2006 | Bourgeois | ................ | F17C 9/00 141/82 |
| 2013/0263610 A1 * | 10/2013 | Mackey | ................ | F17C 5/007 62/50.1 |
| 2013/0305745 A1 * | 11/2013 | Drube | ................ | F17C 7/02 62/50.7 |
| 2015/0027136 A1 * | 1/2015 | Desjardins | ................ | F17C 7/02 62/50.7 |
| 2015/0300570 A1 * | 10/2015 | Beuneken | ................ | F17C 5/02 141/4 |
| 2017/0191619 A1 * | 7/2017 | Snyder | ................ | F17C 7/02 |
| 2018/0128210 A1 * | 5/2018 | Garner | ................ | F02M 21/0221 |
| 2019/0277450 A1 * | 9/2019 | Gustafson | ................ | F17C 5/00 |

\* cited by examiner

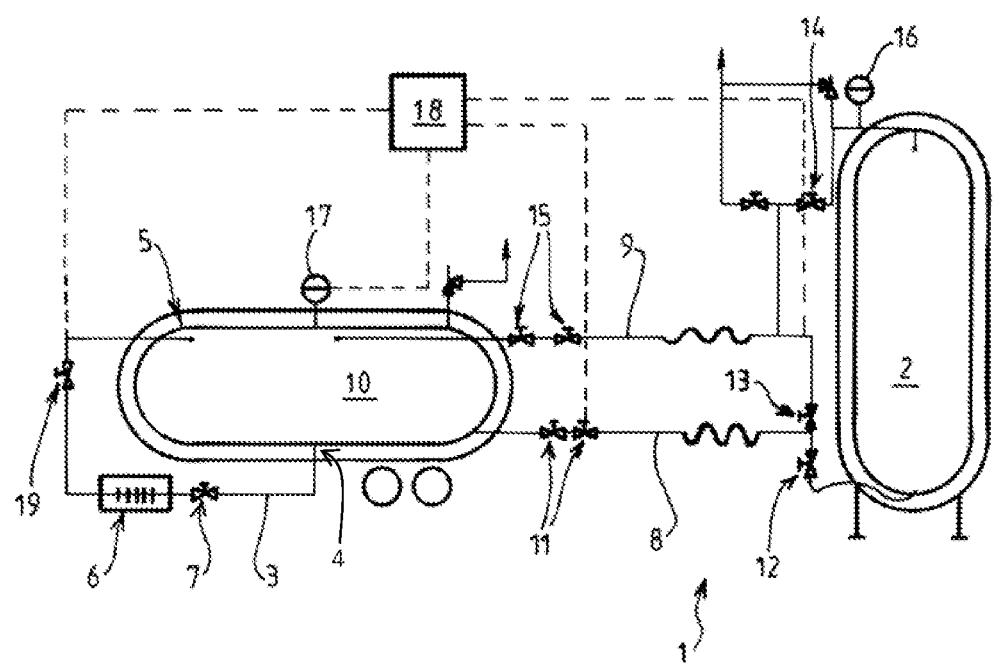

METHOD AND DEVICE FOR FILLING A STORAGE VESSEL WITH LIQUEFIED GAS

CROSS-REFERENCE TO RELATED APPLICATIONS

This application claims the benefit of priority under 35 U.S.C. § 119 (a) and (b) to French patent application No. FR 1900911, filed Jan. 31, 2019, the entire contents of which are incorporated herein by reference.

BACKGROUND

Field of the Invention

The invention relates to a method and a device for filling a storage vessel with liquified gas.

The invention relates more particularly to a method for filling a storage vessel with liquefied gas by means of a tank of liquefied gas, the method comprising a step of transferring liquefied gas from the tank to the storage vessel by means of a pressure differential, in which method the storage vessel, prior to the transfer step, has an internal pressure higher than the internal pressure of the tank.

Related Art

In general, liquid hydrogen is delivered to an installation by means of a difference in pressure. Typically, the storage vessel to be filled is at a pressure of between 3 and 13 bara and the liquid contained in the delivery tank is at a pressure of between 0.3 barg and 13 barg.

In order to achieve this transfer by means of a pressure differential (without using a pump), in most cases it is necessary first of all to pressurize the tank of the delivery semitrailer to a pressure typically higher by 1 barg than the pressure of the fixed storage vessel that is to be filled.

This pressurizing is conventionally performed using a device known as a pressurizing heater. Cold liquid is withdrawn from the tank under gravity and is vaporized in an exchanger, typically an atmospheric exchanger, situated at a low point of the tank. The device therefore comprises a hotspot in a low position. A flow by a thermosiphon effect occurs, and the hot gas created is then naturally returned to the tank. This causes the tank to become pressurized. The speed of pressurizing is typically dependent on the size of the heating exchanger and on the diameter of the piping.

This device does however have drawbacks. Thus, the time needed for pressurizing may be relatively long. In addition, because the motive force of the thermosiphon flow is dependent on the head of liquid column and on the difference in density between the liquid and gas, this device does not work as well when the tank is empty or almost empty. Pressurization then takes even longer to achieve. In addition, this pressurizing introduces heat into the installation. This results in the heating of the liquid hydrogen which ultimately increases the amount of gas lost by evaporation in the logistics.

SUMMARY OF THE INVENTION

One aim of the present invention is to overcome all or some of the above-mentioned disadvantages of the prior art.

To this end, the method according to the invention, in other respects in accordance with the generic definition given thereof in the above preamble, is essentially characterized in that the method comprises, prior to the transfer step, a step of placing the tank and the storage vessel in fluidic communication in order to ensure a drop in the pressure in the storage vessel to the benefit of the tank and a step of increasing the pressure in the tank using a pressurizing device.

Moreover, embodiments of the invention may comprise one or more of the following features:
- the step of increasing the pressure in the tank via the pressurizing device is performed at the same time as the step of placing the tank and the storage vessel in fluidic communication and/or after the step of placing the tank in fluidic communication, during a step in which this fluidic communication between the tank and the storage vessel is interrupted
- the step of placing the tank and the storage vessel in fluidic communication lowers the pressure in the storage vessel to the benefit of the tank down to a determined level in which the pressure in the storage vessel is equal to the pressure in the tank or exceeds the pressure in the tank by a determined limited value of between 0.5 and 5 bar, and notably of between 0.5 and 1 bar,
- the step of increasing the pressure in the tank increases the pressure in the tank up to a determined level in which the pressure in the tank exceeds the pressure in the storage vessel by a determined value of between 0.5 and 5 bar, and notably of between 1 and 2 bar,
- the step of placing the tank and the storage vessel in fluidic communication is performed via at least one transfer pipe having one end connected to the lower part and/or to the upper part of the tank and another end connected to the lower part and/or to the upper part of the storage vessel,
- the step of placing the tank and the storage vessel in fluidic communication is performed via at least one transfer pipe having one end connected to the upper part of the tank and one end connected to the upper part of the storage vessel,
- the device for pressurizing the tank comprises a tank-pressurizing circuit comprising, between a fluid-aspiration first end connected to the tank and a fluid-return second end connected to the tank, a fluid heating member and a set of one or more heating valves for controlling the circulation of the fluid in said pressurizing circuit.

The invention also relates to a device for filling a liquefied-gas storage vessel comprising a tank of liquefied gas intended to transfer liquefied gas into the storage vessel by means of a pressure differential, the device comprising a tank-pressurizing circuit comprising, between a fluid-aspiration first end connected to the tank and a fluid-return second end connected to the tank, a fluid heating member and a set of one or more heating valves for controlling the circulation of the fluid in said pressurizing circuit, the device further comprising at least one fluid transfer pipe comprising a first end connected to the tank and a second end intended to be connected to the storage vessel and comprising a set of one or more transfer valves for controlling the circulation of the fluid in said transfer pipe, the device comprising a set of one or more sensors for measuring the pressure in the tank and/or in the storage vessel, the device further comprising a fluid transfer pipe having a first end connected to the upper end of the tank and another end intended to be connected to the upper end of the storage vessel.

According to other possible particular features, the device comprises an electronic control and data processing and storage member configured to control at least part of the set of valves, the control member being configured to perform, prior to a transfer of fluid from the tank to the storage vessel when the pressure in the storage vessel is higher than the pressure in the tank: an opening of the set of one or more transfer valves in order to ensure a transfer of pressure between the storage vessel and the tank, and, after or during the transfer of pressure between the storage vessel and the tank, an opening of the set of one or more heating valves in order to increase the pressure in the tank, then a closing of the set of one or more heating valves and an opening of the set of one or more transfer valves in order to ensure a transfer of liquefied gas from the tank to the storage vessel by means of a pressure differential.

The invention may also relate to any alternative device or method comprising any combination of the features above or below within the scope of the claims.

BRIEF DESCRIPTION OF THE FIGURES

Other distinctive features and advantages will become apparent on reading the description below, given with reference to:

FIG. 1 which is a schematic and partial view illustrating one example of the structure and operation of a device according to the invention.

DETAILED DESCRIPTION OF THE INVENTION

The installation 1 depicted in FIG. 1 comprises a device for filling a liquefied-gas storage vessel 2. The storage vessel 2 is, for example, a fixed, insulated double-wall vacuum storage vessel containing liquefied hydrogen.

The installation 1 comprises a tank 10 of liquefied gas (liquefied hydrogen for example), for example carried by a semitrailer and intended to transfer liquefied gas to the storage vessel 2 by means of a pressure differential.

The tank 10 comprises a pressurizing heater, namely a circuit 3 for pressurizing the tank 10, as mentioned hereinabove. This pressurizing circuit 3 comprises, between a fluid-aspiration first end 4 connected to the tank 10 (notably the bottom part) and a fluid-return second end 5 connected to the tank 10 (notably in the top part), a fluid heating member 6 (atmospheric heat exchanger or the like positioned in the bottom part) and a set of one or more heating valves 7, 19. For example, the pressurizing circuit 3 comprises a heating valve 7, preferably controlled and automatic, for controlling the circulation of the fluid in said pressurizing circuit 3 (by means of a thermosiphon effect) and a shut-off valve 19 (preferably manually controlled).

The device 1 further comprises at least one fluid-transfer pipe (and, in this example, two pipes 8, 9) each comprising a first end connected to the tank 10 and at least one second end intended to be connected to the storage vessel 2. The transfer pipe or pipes 8, 9 may be connected in parallel to the lower end and/or to the upper end of the storage vessel 2 by suitable circuitry.

The installation and notably each transfer pipe 8, 9 comprises a set of transfer valves 11, 12, 13, 14, 15 for controlling the circulation of the fluid in the transfer pipe or pipes 8, 9. For example, a first transfer pipe 8 connected to the lower end of the tank 10 comprises two valves 11 in series which may respectively consist of an automatic safety shut-off valve and a manually operated shut-off valve.

Likewise, the second transfer pipe 9 (connected to the top part of the tank 10) may comprise two valves 15 in series which may respectively consist for example of an automatic safety shut-off valve and a manually operated shut-off valve.

Each transfer pipe 8, 9 may have a flexible end that comes to be connected to the circuitry of the storage vessel 2 allowing it to communicate with the upper end and/or with the lower end of the storage vessel. The circuitry of the storage vessel advantageously comprises a set of valves 12, 13, 14 which may be controlled or manually operated valves. The tank 10 and the storage vessel 2 may comprise conventional venting/protection valve devices.

Thus, a delivery operator may connect the transfer pipe or pipes 8, 9 of the mobile tank 10 to the circuitry of the storage vessel 2. If the pressure in the storage vessel 2 is higher than the pressure in the tank 10, preventing a transfer by pressure difference, the operator may open the valves 14 and 15 (placing the upper parts of the tank 10 and of the storage vessel 2 in communication) and/or the valves 13 and 11 (placing the lower parts of the tank 10 and of the storage vessel 2 in communication) in order to equalize the pressures in the tank 10 and in the storage vessel 2. According to another nonlimiting option, the operator may open the valve 14 (connecting the upper part of the storage vessel 2) and use the line 9 connected to the upper part of the tank (by opening the valve 15) and/or the line 8 connected to the lower part of the tank 10 (by opening the valves 11 and 13).

When the pressure within the tank 10 reaches or comes sufficiently close to the pressure of the storage vessel (for example a pressure difference of 5 bar or less (and notably a difference of between 0.5 and 1 bar for example). The transfer valves 11, 15 can be closed.

The operator can then open the heating valves 7, 19 in order to increase the pressure in the tank 10 by activating the heating loop.

When the pressure in the tank 10 sufficiently exceeds the pressure in the storage vessel 2 (for example by 0.5 to 5 bar, notably by one to two bar), the heating valves 7, 19 can be closed. All or some of the transfer valves 11, 15, 12, 13, 14 can then be opened in order to allow the storage vessel to be filled by means of a pressure differential. This filling may consist in supplying the storage vessel 2 from the bottom (corresponding valve 13 open) in order to increase the pressure in the storage vessel and/or from the top (corresponding valve 14 open) in order to decrease the pressure in the storage vessel 2.

It should be noted that, advantageously, the increase in pressure in the tank 10 (activating the heating loop) may begin even during the operation of equalizing the pressures in the tank 10 and in the storage vessel 2 (valves 11, 15 and 14 and/or 13 open). This makes it possible to speed up the pressurizing of the tank 10 even more.

The tank 10 and/or the storage vessel 2 may comprise a set of one or more pressure-measurement sensors 16, 17.

The installation (for example the mobile tank 10 or an external control unit) may comprise an electronic control and data processing and storage member 18 configured to control all or some of the valves. This electronic control member 18 may comprise a microprocessor, a computer, or any other suitable device.

This control member 18 may control all or some of the valves or other components of the device and may notably receive the aforementioned pressure measurements as well as instructions to fill or to stop.

This control member 18 may automate or control all or some of the manual operations described above.

Thus, when a filling tank 10 comes to be connected to a storage vessel 2 in order to fill same, and the pressure in the storage vessel 2 is higher than the pressure in the tank 10, the control member 18 may be configured to perform, prior to a transfer of fluid from the tank 10 to the storage vessel 2, an opening of the set of one or more transfer valves 11, 15 and 14 in order to ensure a transfer of pressure between the storage vessel 2 and the tank 10.

As before, the purpose of this is to lower the pressure in the storage vessel to the benefit of the tank 10.

When a determined equalizing of pressure has been achieved, these valves are closed again in order to isolate the storage vessel 2 and the tank 10. In this configuration (or even before the end of this pressure transfer), the pressurizing of the tank 10 can be activated (opening the set of heating valves 7, 19 in order to increase the pressure in the tank 10 as described above).

When the pressure in the tank 10 reaches a sufficient value above the pressure in the storage vessel 2, the pressurizing can be interrupted and a transfer of liquid from the tank to the storage vessel by means of a pressure differential can be performed.

The method and device thus make it possible to use the pressure in the storage vessel 2 to pressurize the delivery tank 10 more quickly. The estimated time saving may in certain cases reach as much as 30 minutes to 2 hours per delivery, notably in the case of several successive deliveries.

The tank 10 is thus pressurized with gas that is relatively cold. The additions of energy to the tank 10 are therefore limited.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for filling a storage vessel with liquefied hydrogen from a tank of liquefied hydrogen, the storage vessel initially being at a higher pressure than the tank, said method comprising the steps of:
   providing a storage vessel;
   providing:
      a semitrailer carrying the tank of liquefied hydrogen;
      a first fluid transfer pipe that has first and second ends, the first end of the first fluid transfer pipe being connected to an upper part of an interior of the tank of liquefied hydrogen, the first fluid transfer pipe including at least one transfer valve controllable or operable to allow or prevent fluid communication between the upper part of the interior of the tank of liquefied hydrogen and the second end of the first fluid transfer pipe;
      a second fluid transfer pipe that has first and second ends, the first end of the second fluid transfer pipe being connected to a lower part of the interior of the tank of liquefied hydrogen, the second fluid transfer pipe including at least one transfer valve controllable or operable to allow or prevent fluid communication between the lower part of the interior of the tank of liquefied hydrogen and the second end of the second fluid transfer pipe;
      a pressurizing device for increasing a pressure in the tank of liquefied hydrogen to a level higher than a pressure in storage vessel, thereby allowing a transfer of the liquefied hydrogen from the tank of liquefied hydrogen to the storage vessel through pressure differential, the pressurizing device being a tank-pressurizing circuit that comprises, between a fluid-aspiration first end connected to the tank of liquefied hydrogen and a fluid-return second end connected to the tank of liquefied hydrogen, a fluid heating member and a set of one or more heating valves for controlling the circulation of the hydrogen in the pressurizing circuit; and
      an electronic control and data processing and storage member for controlling at least part of the set of one or more heating valves;
   connecting the second end of the first fluid transfer pipe to a circuitry of the storage vessel that includes a plurality of valves allowing or preventing fluid communication between the second end of the first fluid transfer pipe with an upper part of an interior of the storage vessel or a lower part of the interior of the storage vessel;
   connecting the second end of the second fluid transfer pipe to the circuitry, the plurality of valves of the circuitry allowing or preventing fluid communication between the second end of the second fluid transfer pipe with the upper or lower part of the interior of the storage vessel;
   placing the upper part of the interior of the tank of liquefied hydrogen and the interior of the storage vessel in fluidic communication, via the at least one valve of the first fluid transfer pipe and the plurality of valves of the circuitry, to equalize pressure between them, resulting in a drop in the pressure in the storage vessel and an increase in pressure in the tank of liquefied hydrogen such that the pressure in the storage vessel, in comparison to the pressure in the tank of liquefied hydrogen, is lowered down to a predetermined level at which the pressure in the storage vessel is equal to the pressure in the tank of liquefied hydrogen or exceeds the pressure in the tank by a predetermined value of between 0.5 and 5 bar;

placing the lower part of the interior of the tank of liquefied hydrogen and the interior of the storage vessel in fluid communication, via the at least one valve of the second fluid transfer pipe and the plurality of valves of the circuitry; and using the pressurizing device to increase the pressure in the tank of liquefied hydrogen to a level higher than the pressure in the storage vessel, thereby causing a transfer of liquefied hydrogen from the tank of liquefied hydrogen to the storage vessel through pressure differential, wherein:

after or during the transfer of pressure between the storage vessel and the tank of liquefied hydrogen, the electronic control and data processing and storage member controls an opening of the set of one or more heating valves in order to increase the pressure in the tank of liquefied hydrogen, and the electronic control and data processing and storage member controls a closing of the set of one or more heating valves and an opening of the at least one valve of the first fluid transfer pipe and the at least one valve of the second fluid transfer pipe in order to ensure a transfer of liquefied hydrogen from the tank of liquefied hydrogen to the storage vessel using a pressure differential.

2. The method of claim 1, wherein
when a pressure in the tank of liquefied hydrogen reaches a sufficient value above a pressure in the storage vessel, said step of using a pressurizing device is interrupted and a transfer of liquid hydrogen from the tank of liquefied hydrogen to the storage vessel is carried out by way a pressure differential between the tank and the storage vessel.

3. The method of claim 1, wherein the step of using the pressurizing device increases the pressure in the tank up to a predetermined level at which the pressure in the tank exceeds the pressure in the storage vessel by a predetermined value of between 0.5 and 5 bar.

* * * * *